United States Patent [19]
Ksendzov

[11] Patent Number: 6,044,335
[45] Date of Patent: Mar. 28, 2000

[54] PRODUCTIVITY METRICS FOR APPLICATION SOFTWARE SYSTEMS

[75] Inventor: Sergey Ksendzov, Chatham, N.J.

[73] Assignee: AT&T Corp., New York, N.Y.

[21] Appl. No.: 08/997,661

[22] Filed: Dec. 23, 1997

[51] Int. Cl.[7] .................................................. G06F 15/20
[52] U.S. Cl. ......................... 702/182; 702/186; 709/224
[58] Field of Search ............................. 345/115; 455/69;
370/410; 709/105, 224; 702/182, 186

[56] References Cited

U.S. PATENT DOCUMENTS

| | | | |
|---|---|---|---|
| 4,720,778 | 1/1988 | Hall et al. | 714/38 |
| 4,849,879 | 7/1989 | Chinnaswamy et al. | 706/45 |
| 5,062,055 | 10/1991 | Chinnaswamy et al. | 702/182 |
| 5,067,107 | 11/1991 | Wade . | |
| 5,267,877 | 12/1993 | Friedrich et al. | 439/584 |
| 5,325,525 | 6/1994 | Shan et al. | 29/426.4 |
| 5,339,445 | 8/1994 | Lasztoryi | 713/324 |
| 5,375,070 | 12/1994 | Hershey et al. | 709/224 |
| 5,379,406 | 1/1995 | Wade | 395/500.42 |
| 5,446,874 | 8/1995 | Waclawsky et al. | 714/1 |
| 5,455,821 | 10/1995 | Schaeffer et al. | 370/17 |
| 5,493,689 | 2/1996 | Waclawsky et al. | 710/1 |
| 5,495,471 | 2/1996 | Ching-hua | 370/16 |
| 5,530,701 | 6/1996 | Stillman et al. | 370/94.1 |
| 5,551,066 | 8/1996 | Stillman et al. | 455/69 |
| 5,559,527 | 9/1996 | Quinn | 345/115 |
| 5,845,310 | 12/1998 | Brooks | 711/3 |

*Primary Examiner*—Kamini Shah
*Attorney, Agent, or Firm*—Morgan & Finnegan, LLP

[57] ABSTRACT

A system and method for generating a class of weighted intensity performance metrics and a class of relative performance metrics for a computer system. Additionally, a method for accumulating data for generating the two classes of performance metrics. A record is generated that is associated with a transaction performed by an application process $A_i$ running on a computer system. A tick count is generated representing a total amount of a resource of the computer system that is consumed by application process $A_i$ for completion of the transaction. Each increment of the tick count represents a unit of consumption of the resource. A performance metric corresponding to a quality of performance of the computer system for application process $A_i$ and related to a metric value M1 is generated based on records and tick counts that are associated with the transaction performed by the application process $A_i$.

40 Claims, 1 Drawing Sheet

PRODUCTIVITY METRICS FOR APPLICATION SOFTWARE SYSTEMS

BACKGROUND OF THE INVENTION

1. Field of the Invention

The present invention relates to the field of computer software systems. More particularly, the present invention relates to a system and a method of generation of performance metrics for application computer systems.

2. Description of the Related Art

Large-scale application system performance is a major issue in a computing system production environment. Unexpected performance problems may arise because some resources of a computing system may be quickly exhausted, while other resources remain abundant. Most system performance problems are of this kind of problem because software applications, or modules, that are simultaneously executed on a computing system compete for the limited resources of the system and, consequently, may adversely affect the overall performance of the system.

Performance considerations for large-scale computer systems include, for example, performance tuning, job scheduling, and capacity planning. Traditionally, the key tools used for resolving performance problems have been performance metrics and include a spectra of performance metrics, such as hardware metrics, operating system related metrics, connectivity metrics, application performance metrics, etc.

Conventional application performance metrics belong to two major categories: global metrics and vector metrics. Global metrics, sometimes referred to as total or integral metrics, accumulate information relating to consumption of a specific resource for an entire application system over a specified period of time. The resource consumption information is accumulated without differentiation between different applications and processes that execute transactions in consuming the resource. Global metrics based on system CPU usage, I/O utilization, or records per hour, for example, do not provide quantitative insight to system performance because system loads vary, and because contributions by different types of application processes, for example, batch transactions and queries, are not properly taken into account. That is, summing a total number of records (or a total of another unit of work) produced on a computing system by different application processes over certain period of time is the equivalent of adding apples and oranges because the combination of system components and their respective activities constantly change. Even qualitatively, conventional global metrics may be misleading.

The second category of metrics, vector metrics, usually consists of few selected total metrics. Even if a vector metric consists of parameters related to every specific application process of the system, a vector metric is not particularly usable and does not provide significant insight to performance of a computing system. For example, it is difficult to decide whether a computing system having a vector defined as (CPU1=55, IO1=118, RECORDS1=83, CPU2=18, IO2=339, RECORDS2=117) performs better that another computing system having a vector defined as (CPU1=25, IO1=148, RECORDS1=63, CPU2=118, IO2=139, RECORDS2=137).

What is needed is an objective performance metric that can be used for evaluating application system performance and that has a reasonable physical justification. What is also needed is a performance metric that is sensitive to a contention between different processes for all types of resources and data.

SUMMARY OF THE INVENTION

The present invention provides a family of metrics producing objective measures of system performance changes during the course of any repetitive task executed by complex application systems, have a reasonable physical justification, and are applicable to any application environment. The metrics of the present invention can be used directly and/or in application management software as a foundation for performance alerts, corrective events, and for production scheduling and planning. In either configuration, the metrics of the present invention are an application system performance tuning instrument that can be used for studying a group of applications, a type of application, or a whole system, and for providing clues for optimum system tuning.

The present invention provides a method for constructing a class of weighted-intensity application computer system metrics. According to the invention, at least one computer system resource is selected with each selected computer system resource being consumed by at least one application process. A unit of work associated each computer system resource is selected with the selected unit of work associated each computer system resource being produced by consumption of the computer system resource by each application process consuming the computer system resource, the same unit of work produced by each application process consuming the computer system resource. A ratio of an amount of units of work to an amount of the selected computer system resource consumed by each application process is generated for each selected computer system resource. Lastly, a class of weighted-intensity application computer system metrics is formed with each member of the class of weighted-intensity application computer system metrics being a series of the generated ratios.

The ratio of the amount of units of work to the amount of the selected computer system resource consumed for the i-th application process is a weighted-intensity for the i-th application process and is defined as $$A_i = \frac{\text{Ticks}_i}{\text{Rec}_i}, \quad (1)$$

wherein, $\text{Ticks}_i$ is the amount of the selected computer system resource consumed by the i-th application process, and $\text{Rec}_i$ is the amount of units of work produced by the i-th application process consuming the selected computer system resource. Preferably, both $\text{Ticks}_i$ and $\text{Rec}_i$ are measured over a same predetermined time interval and in a same application computer system environment.

The method of the present invention also includes the steps of weighting $A_i$ for the i-th application process by using a respective share of the selected computer system resource of the total selected computer system resource consumed by the i-th application process, and generating each term $X_i$ of the class of weighted-intensity application computer system metrics for the i-th application process defined as $$X_i = \frac{(A_i(t) * \text{Ticks}_i)}{\sum_{n=1}^{n=N} \text{Ticks}_i(t)}, \quad (2)$$

wherein N is a total number of application processes consuming the selected computer system resource.

Each term $X_i(t)$ of the class of weighted-intensity application computer system metrics for the i-th application process is generated with each term $X_i(t)$ being a relative weighted-intensity of consumption of the selected computer system resource by the i-th application process and being defined as $$X_i(t) = \frac{A_i(t)}{A_i(0)}, \quad (3)$$

wherein $A_i(0)$ is measured at a predetermined time. Each term $X_i$ of the class of weighted-intensity application computer system metrics for the i-th application process is generated defined as $$X_i = \frac{(X_i(t) * \text{Ticks}_i)}{\sum_{n=1}^{n=N} \text{Ticks}_i(t)}, \quad (4)$$

wherein, N is a total number of application processes consuming the selected computer system resource.

The class of weighted-intensity application computer system metrics M1 is defined as $$M1 = \sum_{j=1}^{j=K} \frac{\sum_{n=1}^{n=N} (X_i(t) * \text{Ticks}_i(t))}{\sum_{n=1}^{n=N} \text{Ticks}_i(t)}, \quad (5)$$

wherein, K is a total number of computer system resources.

The present invention also provides a method for measuring performance of a computer system. A measurement of consumption of a computer system resource during execution of an application computer system is defined with the application computer system including at least one application process. At least two measurements for an i-th application process are made with a time interval between the two measurements including at least one transaction successfully completed by the application process in consuming the computer system resource. Each measurement includes an amount of units of work ($\text{Rec}_i$) produced by the i-th application process and an amount of the computer system resource ($\text{Ticks}_i$) consumed by the i-th application process in producing the amount of units of work $\text{Rec}_i$. A class of weighted-intensity computer system metrics is generated having at least one term, each term of the weighted-intensity class computer system metrics being based on the measurements for the i-th application process. Each transaction is a repetitive transaction that can be repeated any number of times, and the time interval between each measurement is a predetermined time interval and is equal between each measurement.

According to the invention, the metrics of the present invention for the at least one application process on the computer system can be modeled. Similarly, the at least one application process can be executed and measured on the computer system.

The present invention also provides the step of forming an intensity term for the i-th application process defined as $$A_i = \frac{\text{Ticks}_i}{\text{Rec}_i}. \quad (6)$$

Further, the present invention provides the step of generating a baseline intensity term for the i-th application process defined as $$A_i(0) = \frac{\text{Ticks}_i(0)}{\text{Rec}_i(0)}, \quad (7)$$

wherein the time interval between the two measurements forming the baseline intensity term is defined as a base measurement interval. The relative intensity term for the i-th application process is generated defined as $$X_i(t) = \frac{A_i(t)}{A_i(0)}. \quad (8)$$

A class of relative weighted-intensity application computer system metrics for the i-th application process is generated defined as $$M1 = \frac{\sum_{n=1}^{n=N} (X_i(t) * \text{Ticks}_i(t))}{\sum_{n=1}^{n=N} \text{Ticks}_i(t)}, \quad (9)$$

wherein, N is a total number of application processes.

An incremental relative intensity for the i-th application process is generated defined as $$X_i(t) = \frac{A_i(t) - A_i(0)}{A_i(0)}. \quad (10)$$

A weighted-intensity metric M3 for a predetermined computer system resource is generated defined as $$M3 = \frac{\sum_{n=1}^{n=N} (A_i(t) * \text{Ticks}_i(t))}{\sum_{n=1}^{n=N} \text{Ticks}_i(t)}, \quad (11)$$

A relational class metric M4 corresponding to a number of averaged records of the computer system is generated defined as A metric M5 is generated corresponding to a relative measure of $$M4 = \frac{\sum_{n=1}^{n=N} \text{Ticks}_i(t)}{\left(\frac{\sum_{n=1}^{n=N} (A_i(t) * \text{Ticks}_i(t))}{\sum_{n=1}^{n=N} \text{Ticks}_i(t)}\right)}. \quad (12)$$

production change of the application computer system for the i-th application process and is defined as $$M5 = \frac{M4}{M4(0)} * \frac{M3(0)}{M3}. \quad (13)$$

According to one alternative, the computer system resource includes a plurality of computer system resources consumed by the i-th application process, in which case the method of the present invention provides that an intensity term for the i-th application process and the j-th computer system resource is formed defined as $$A_{ij} = \frac{Ticks_{ij}}{Rec_{ij}}. \quad (14)$$

A baseline intensity term for the i-th application process and the j-th computer system resource is generated defined as $$A_{ij}(0) = \frac{Ticks_{ij}(0)}{Rec_{ij}(0)}, \quad (15)$$

wherein the time interval between the two measurements forming the baseline intensity term is defined as a base measurement interval.

A relative intensity term for the i-th application process and the j-th computer system resource is generated defined as $$X_{ij}(t) = \frac{A_{ij}(t)}{A_{ij}(0)}. \quad (16)$$

A class of relative weighted-intensity application computer system metrics for the i-th application process and the j-th computer system resource is generated defined as $$MR1 = \sum_{j=1}^{j=K} \frac{\sum_{n=1}^{n=N}(X_{ij}(t) * Ticks_{ij}(t))}{\sum_{n=1}^{n=N} Ticks_{ij}(t)}, \quad (17)$$

wherein, K is a total number of computer system resources.

An incremental relative intensity for the i-th application process and the j-th computer system resource is generated defined as $$X_{ij}(t) = \frac{A_{ij}(t) - A_{ij}(0)}{A_{ij}(0)}. \quad (18)$$

A weighted-intensity metric M3 for the j-th computer system resource is generated defined as $$M3 = \frac{\sum_{n=1}^{n=N}(A_{ij}(t) * Ticks_{ij}(t))}{\sum_{n=1}^{n=N} Ticks_{ij}(t)}. \quad (19)$$

A relational class metric M4 corresponding to a number of averaged records of the computer system is generated defined as $$M4 = \frac{\sum_{n=1}^{n=N} Ticks_{ij}(t)}{\left(\frac{\sum_{n=1}^{n=N}(A_{ij}(t) * Ticks_{ij}(t))}{\sum_{n=1}^{n=N} Ticks_{ij}(t)}\right)}. \quad (20)$$

A metric M5 corresponding to a relative measure of production change of the application computer system for the i-th application process and the j-th computer system resource is generated defined as $$M5 = \sum_{j=1}^{j=K}\left(\frac{M4}{M4(0)} * \frac{M3(0)}{M3}\right). \quad (21)$$

BRIEF DESCRIPTION OF THE DRAWING

The present invention is illustrated by way of example and not limitation in the accompanying FIGURE that shows an exemplary computing system for which the metrics of the present invention are applicable.

DETAILED DESCRIPTION

The present invention provides a method for creating of a family of performance metrics for the specific area of application computer systems. Areas such as hardware performance, operating system performance, etc., are outside the scope of the present invention. Application systems are a set of processes or tasks under control of a computing operating system. Each process of the set does not differ significantly from other processes of the set, but differs to the extent of providing a different end result. Processes of an application system produce "units of work" consuming all types of resources of the computing system and its operating system. An example of "units of work" are records inserted into a database. An example of a computing system resource that is consumed by an application in producing "units of work" is CPU time measured in units of ticks, such as seconds. For simplicity, the term "ticks" will be used herein for increments of a predetermined unit of resource consumption. A repetitive transaction is an integral set of operations forming a specific task within a job. A transaction is a set of operations forming a specific task within a job. The present invention is concerned with the number of units of work produced in a defined interval.

An aspect of an application system is a multiplicity of data sources, of processes and "units of work". Such complex systems are easily characterized by a multidimensional set of parameters or a vector of parameters. Such a characterization is not usable for the major purposes that metrics are used, that is, system improvement by performance tuning and better job (process) scheduling. This is because in a real life situation, the contribution of different components of a system varies significantly over time and comparison of vector-based metrics for two different states of a system, for example, metrics measured on two different days, is not possible for a general case.

A natural solution is a single-number, global (or integral) type metric that is based on contributions from different processes, such as CPU utilization. Nevertheless, such integral metrics are too crude of an instrument to be an effective tool for application system tuning. Attempts to translate multidimensional metrics into a single-number parameter have resulted in the equivalent of adding of apples and oranges.

To solve the problem of a single-number metric, the present invention provides a method for generating of a family of metrics for a broad spectra of application systems. The essence of metrics of the present invention is based on the following principles. The first principle is that the metric is a function of a weighted relative improvement, or change, in the consumption of one or more resources by application processes producing units of work. The principle of relative improvement can be applied to functions of computing system resources. Another principle on which the present invention is based is that resources that are consumed to produce units of work by every application process are consumed in only one way. That is, resources are normalized (divided) by the number of units of work that are produced by consumption of the resource by the application processes. Application system activity is usually described in terms of transactions that are repetitive integral sets of actions and are usually specific tasks within a job.

Time is not a part of the metric calculations of the present invention. Instead, a time interval is used over which transactions are executed that consume resources and generate units of work. The time interval sets the limits for metric granularity. The present invention does not consider how resource consumption is distributed within the time interval. The time interval over which a specific metric is calculated over is selected to be long enough for guaranteeing that the execution of a particular transaction is complete at least, for example, 95% of the time. Preferably, the time interval is selected so that a number of transaction execution periods are complete.

The metrics provided by the present invention are equally valid in any system or subsystem having multiple application processes, and can be used for modelling an application or group of applications that run on a computer system. For example, the performance of a subsystem of database-related processes in a UNIX system can be measured and evaluated either directly as the processes are executed or modelled before their actual operation in a system. Each metric provided by the present invention can be calculated separately for each group of application processes of the subsystem, or the metrics can be calculated for all application processes of the subsystem collectively. There is no limitation on the time interval for collecting data for calculating the metrics of the present invention. The only requirement is that every process measured must produce repetitious "units of work" (transaction) for the time interval being analyzed. Of course, for the metrics of the present invention to accurately reflect system performance problems, all problems with individual applications or modules, such as programming errors or bugs, must be resolved in advance.

To illustrate the present invention, consider the example of a simple metric M1 created for characterizing an application system that generates records in a database system as a unit of work. For this example, metric M1 reflects consumption of only one resource, such as CPU usage measured in seconds or ticks, by several application processes. Here, the variable $Ticks_i$ is used for identifying the CPU consumption (usage) by i-th process. The result of execution of repetitive transactions, in this case generation of database records, are units of work identified as $Rec_i$ for each i-th process. Another exemplary units of work that is equally applicable to this example is blocks of data copied locally from file to file or over the network. Again, a transaction is a set of operations forming a specific task within a job, and the present invention is concerned with the number of units of work produced in a defined interval.

Figure 1:
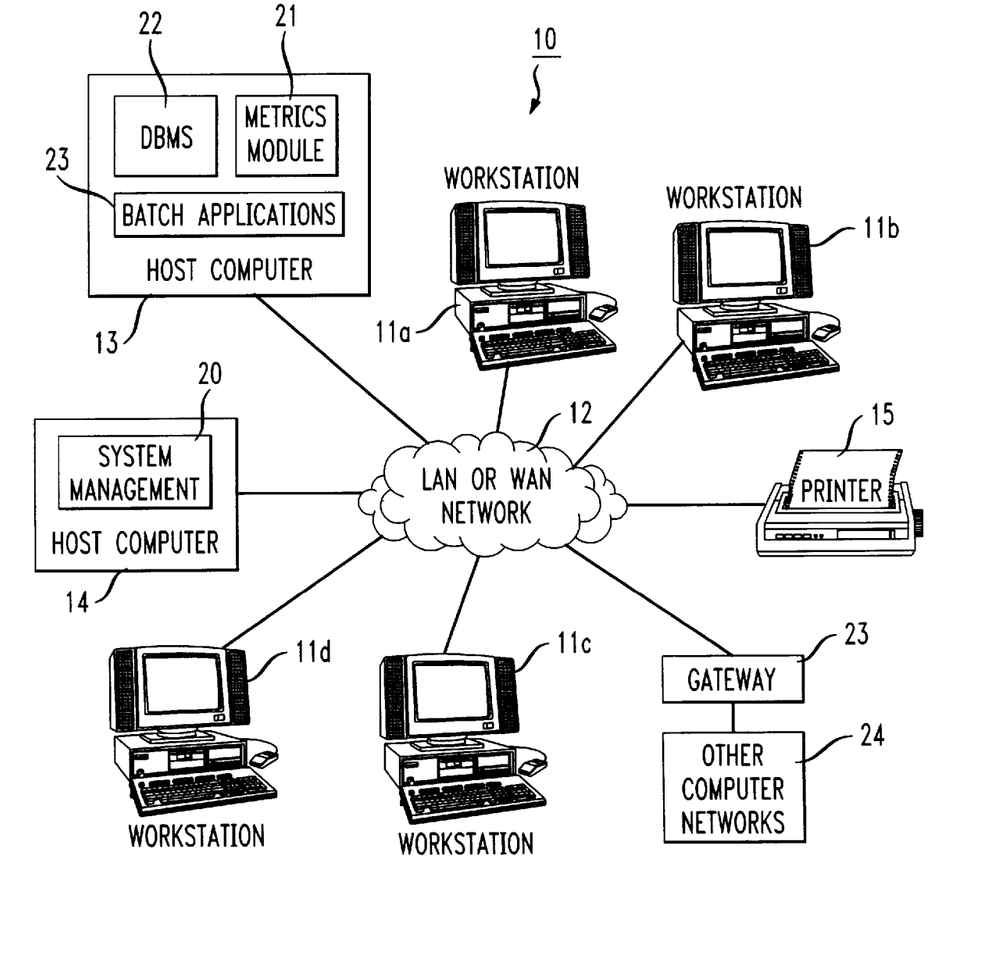

Let us consider transactions executed in a framework of an exemplary computing system 10 shown in the Figure. Computing system 10 has a plurality of workstations 11a–11d and host computers/database servers 13 and 14 connected in a well-known manner to a network 12, such as a local area network (LAN) or a wide area network (WAN). A gateway 23 can also be connected to network 12 so that network 12 can be connected to other computer networks 24. Database server 13 includes an RDBMS 22, applications software 23, and a metrics module 21. Database server 14 includes a system management module 20. Workstations 11 run client applications that request resource consumption.

File server 14 runs a system management application 20 for managing computing system 10. A metrics module 21 can be run on any host running applications and provides metrics values for display or collection on workstations 11a–11d, or for use by system management application 20. Information and data are accumulated as a result of execution of every transaction, that is, a number of units of work (i.e., records) and CPU usage measured in ticks. Information and data regarding other resources are accumulated in the same manner. Metrics module 21 retrieves the resource consumption data with a time interval defined by the system administrator and calculates the metric M1 (defined below). Application 20 collects applications metrics in addition to many other metrics that are, for example, hardware-related, operating system-related, connectivity-related, etc. The collected metrics are used by application 20 primarily for two purposes: to set alarms that are based on conditions defined by a system administrator or by default, and for preparing and executing corrective actions based on metric values. For example, an operating system level metric can be used for setting an alarm if usage of a certain disk exceeds a threshold level. Extra space can be allocated on another disk as a corrective action. In the case of an application metric, the beginning of an execution of a new report might lead to an increase in data contentions and a strong degradation of the application metric value might trigger an alarm. A corrective action by an operator or by a system administrator might be to reschedule execution of the report to a different time slot.

As previously mentioned, the metrics of the present invention are based on a discrete series of measurements of a specific resource consumption, for example, CPU consumption, and the units of work produced from the consumption of the resource by a specific process or task, such as records. That is, $$A_i(t) = \frac{(Ticks)_i}{(Rec)_i}, \qquad (22)$$

where $A_i(t)$ is the number of ticks per record for the i-th application process measured at time t, and where $(Rec)_i$ is the number of records (units of work) generated by the i-th process as a result of CPU consumption (resource) by the i-th process as measured by the number of ticks $(Ticks)_i$. Resource consumption occurs in the course of executing any number of transactions, usually a sufficiently large number, that were successfully completed during a fixed time interval preceding time t. The fixed time interval is selected to be the same for all measurements at all times t for all processes, including t=0. $(Ticks)_i$ and $(Rec)_i$ are collected during the fixed time interval.

A baseline for the i-th application process, $A_i(0)$, is measured at any arbitrary time, for example, at t=0, or when a particular record is generated for the first time for the i-th application. That is, $$A_i(0) = \frac{Ticks_i(0)}{Rec_i(0)} \qquad (23)$$

is a total number of tick counts $Ticks_i(0)$ consumed by the i-th application per number of records $Rec_i(0)$ produced for the i-th application measured at time t=0 for a time interval preceding t=0.

A measure of relative application process performance with respect to the baseline measurement is $$X_i(t) = \frac{A_i(t)}{A_i(0)}. \tag{24}$$

The basic metric M1 of the present invention is defined to be:

$$M1 = \frac{\sum_{n=1}^{n=N}(X_i(t) * Ticks_i(t))}{\sum_{n=1}^{n=N} Ticks_i(t)}, \tag{25}$$

where N is a number of application processes (tasks) involved in the metric. M1 is a relative improvement of the system performance weighted by ticks and represents an implementation of principles discussed earlier.

The present invention provides a second relative performance metric M2 that has the same form as M1, but relates to incremental performance changes of a computer system. For M2, $$X_i(t) = \frac{A_i(t) - A_i(0)}{A_i(0)}. \tag{26}$$

As an alternative for metric M2, a metric M21 is defined using $$X_i(t) = \frac{A_i(t) - A_i(t-1)}{A_i(t-1)}, \tag{27}$$

where, t–1 is a base measurement time immediately preceding measurement time t. Metric M21 is an incremental relative improvement of the system weighted by ticks.

An extension of metric M1 is a third metric M3, where tick values for the i-th application $A_i$ are used in Equation (25) instead of X values. Metric M3 is an averaged number of ticks per record for the application system and is defined to be $$M3 = \frac{\sum_{n=1}^{n=N}(A_i(t) * Ticks_i(t))}{\sum_{n=1}^{n=N} Ticks_i(t)}. \tag{28}$$

Metric M3 is not a relative metric by itself, but is used for generating a relative production metric M5.

Metrics M1, M2 and M3 are each measures of an execution performance of an application system on a computer system, and, as mentioned, each are equally valid in any system or subsystem having multiple application processes. For example, each metric M1, M2 and M3 can be calculated separately for a database subsystem for a group of application processes, or the metrics can be calculated for all application processes collectively. If a relative metric for several resources consumed by application systems in a course of execution of similar transactions for fixed time intervals are created, then metric M1 (and, similarly, metric M2) can be generalized as:

$$M1_j = \sum_{j=1}^{j=K}\left(\frac{\sum_{n=1}^{n=N}(X_{ij}(t) * Ticks_{ij}(t))}{\sum_{n=1}^{n=N} Ticks_{ij}(t)}\right), \tag{29}$$

where $M1_j$ is a relative metric for K resources of the same type, that is, j=1, 2, . . . , K.

Metric M3 is not relative and can not be generalized in this way. Instead, metric M3 is used for generating another relative metric M5.

The present invention also provides metrics for evaluating the production of the computer system by taking into account that the value $\Sigma(Ticks)_i$ is a total number of ticks consumed by an application system and M3 is an average number of ticks per record. The number of "averaged" records produced by a system is then defined by $$M4 = \frac{\sum(Ticks)_i}{M3}, \text{ or} \tag{30}$$

$$M4 = \frac{\sum_{n=1}^{n=N} Ticks_i(t)}{\left(\frac{\sum_{n=1}^{n=N}(A_i(t) * Ticks_{ij}(t))}{\sum_{n=1}^{n=N} Ticks_{ij}(t)}\right)}. \tag{31}$$

That is, $$M4 = \frac{\left(\sum_{n=1}^{n=N} Ticks_i(t)\right)^2}{\sum_{n=1}^{n=N}\left(\frac{Ticks_i^2(t)}{Rec_i(t)}\right)}. \tag{32}$$

Metric M4, like metric M3, not a relative metric. As such, these two metrics can be used for limited goals, for consideration of one resource, or in relative metric like M5.

An improvement in productivity may come from an increase in the number of records or in a decrease of cost, that is, decrease of number of ticks per record. Thus, a fifth metric M5 is defined as $$M5 = \frac{M4}{M4(0)} * \frac{M3(0)}{M3}. \tag{33}$$

and can be generalized for all K types of resources. j=1, 2, . . . , K, using $$M1_j = \sum_{j=1}^{j=K}\left(\frac{\sum_{n=1}^{n=N}(X_{ij}(t) * Ticks_{ij}(t))}{\sum_{n=1}^{n=N} Ticks_{ij}(t)}\right). \tag{34}$$

While the present invention has been described in connection with the illustrated embodiments, it will be appreciated and understood that modifications may be made without departing from the true spirit and scope of the invention.

What is claimed is:

1. A method for forming a class of weighted-intensity application computer system metrics, the method comprising the steps of:

selecting at least one computer system resource, each selected computer system resource being consumed by at least one application process;

selecting a unit of work that is produced when each respective selected computer system resource is consumed by each application process, the same unit of work being produced when the selected computer system resource is consumed by each respective application process in a same application computer system environment;

generating a ratio associated with each selected computer system resource, each respective ratio being defined as an amount of units of work produced over a predetermined interval of time to an amount of the selected computer system resource consumed by each application process consuming the selected computer system resource over the predetermined interval of time; and forming a class of weighted-intensity application computer system metrics, each metric of the class of weighted-intensity application computer system metrics being a series of the generated ratios.

2. The method according to claim 1, wherein the ratio of the amount of units of work produced over the predetermined interval of time to the amount of the selected computer system resource consumed by an i-th application process is a weighted-intensity for the i-th application process defined by $$A_i = \frac{Ticks_i}{Rec_i},$$

wherein, $Ticks_i$ is the amount of the selected computer system resource consumed by the i-th application process over the predetermined interval of time, and $Rec_i$ is the amount of units of work produced by the i-th application process consuming the selected computer system resource over the predetermined interval of time.

3. The method according to claim 2, further comprising the steps of:

weighting $A_i$ for the i-th application process by multiplying $A_i$ by a respective share of the selected computer system resource consumed by the i-th application process over the predetermined interval of time; and generating a term $X_i$ of the class of weight-intensity application computer system metrics for the i-th application process defined as $$X_i = \frac{(A_i(t) * Ticks_i)}{\sum_{n=1}^{n=N} Ticks_n(t)},$$

wherein N is a total number of application processes consuming the selected computer system resource.

4. The method according to claim 2, further comprising the step of generating a term $X_i(t)$ of the class of weighted-intensity application computer system metrics for the i-th application process, each term $X_i(t)$ being a relative weighted-intensity of consumption of the selected computer system resource by the i-th application process over the predetermined interval of time and being defined as $$X_i(t) = \frac{A_i(t)}{A_i(0)},$$

wherein $A_i(0)$ is measured over a predetermined baseline interval of time in the same application computer system environment.

5. The method according to claim 4, further comprising the step of generating a term $X_i$ of the class of weighted-intensity application computer system metrics for the i-th application process defined as $$X_i = \frac{(X_i(t) * Ticks_i)}{\sum_{n=1}^{n=N} Ticks_i(t)}$$

wherein, N is a total number of application processes consuming the selected computer system resource over the predetermined interval of time.

6. The method according to claim 5, wherein the class of weighted-intensity application computer system metrics M1 is defined as $$M1 = \sum_{j=1}^{j=K} \frac{\sum_{n=1}^{n=N}(X_i(t) * Ticks_i(t))}{\sum_{n=1}^{n=N} Ticks_i(t)},$$

wherein, K is a total number of computer system resources.

7. A method for measuring data related to a computer system performance, the method comprising the steps of:

defining a measurement event for measuring data related to performance of a computer system, each measurement being performed during execution of an application computer system, the measurement event occurring every predetermined interval of time, the predetermined interval of time having a sufficient duration for completing at least one transaction by at least one application process i of the application computer system, each transaction consuming a resource j of the computer system, and each transaction including at least one operation being performed by the application process i when the application process i consumes the computer system resource j; and measuring a first unit of data for the application process i at each measurement event, the first unit of data including an amount of a unit of work (Rec)$_i$ produced by consumption of the computer system resource j by the application process i during the predetermined interval of time preceding the measurement event; and measuring a second unit of data for the application process i at each measurement event, the second unit of data including an amount of consumption (Ticks)$_i$ of the computer system resource j consumed by the application process i during the predetermined interval of time preceding the measurement event.

8. The method according to claim 7, further comprising the step of storing the first and second measurements.

9. The method according to claim 7, further comprising the step of generating a single baseline intensity metric $A_i$ at measurement event time t=0 for each application process i and for computer system resource j defined as $$A_i(0) = \frac{Ticks_i(0)}{Rec_i(0)},$$

wherein the predetermined interval of time preceding measurement event time t=0 being defined as a baseline measurement interval.

10. The method according to claim 9, further comprising the step of generating a relative weighted-intensity metric M1 at measurement event time t for each application process i and for computer system resource j defined as $$M1 = \frac{\sum_{n=1}^{n=N}(X_i(t) * Ticks_i(t))}{\sum_{n=1}^{n=N}Ticks_i(t)},$$

wherein, N is a total number of application processes.

11. The method according to claim 9, further comprising the step of generating a relative intensities metric $X_i$ at measurement event time t for each application process i and for computer system resource j defined as $$X_i(t) = \frac{A_i(t)}{A_i(0)}.$$

12. The method according to claim 11, further comprising the step of generating a relative weighted-intensity metric M1 at measurement event time t for each application process i and for computer system resource j defined as $$M1 = \frac{\sum_{n=1}^{n=N}(X_i(t) * Ticks_i(t))}{\sum_{n=1}^{n=N}Ticks_i(t)},$$

wherein, N is a total number of application processes.

13. The method according to claim 9, further comprising the step of generating a weighted intensity metric M3 at measurement event time t for each application process i and for computer system resource j defined as $$M3 = \frac{\sum_{n=1}^{n=N}(A_i(t) * Ticks_i(t))}{\sum_{n=1}^{n=N}Ticks_i(t)}.$$

14. The method according to claim 13, further comprising the step of generating a relational metric M4 at measurement event time t for each application process i and for computer system resource j defined as $$M4 = \frac{\sum_{n=1}^{n=N}Ticks_i(t)}{\left(\frac{\sum_{n=1}^{n=N}(A_i(t) * Ticks_i(t))}{\sum_{n=1}^{n=N}Ticks_i(t)}\right)}.$$

15. The method according to claim 14, further comprising the step of generating a metric M5 corresponding to a relative measure of production change at measurement event time t for each application process i and for computer system resource j defined as $$M5 = \frac{M4}{M4(0)} * \frac{M3(0)}{M3}.$$

16. The method according to claim 9, wherein the transaction completed by the application process i is a repetitive transaction that can be repeated a plurality of times.

17. The method according to claim 9, further comprising the step of generating an incremental relative intensity metric $X_i$ at measurement event time t for each application process i and for computer system resource j defined as $$X_i(t) = \frac{A_i(t) - A_i(0)}{A_i(0)}.$$

18. The method according to claim 17, further comprising the step of generating an incremental relative weighted-intensity metric M1 at measurement event time t for each application process i and for computer system resource j defined as $$M1 = \frac{\sum_{n=1}^{n=N}(X_i(t) * Ticks_i(t))}{\sum_{n=1}^{n=N}Ticks_i(t)},$$

wherein, N is a total number of application processes.

19. The method according to claim 18, further comprising the step of generating an incremental relative intensities metric $X_i$ at measurement event time t for each application process i and for computer system resource j defined as $$X_i(t) = \frac{A_i(t)}{A_i(0)}.$$

20. The method according to claim 19, further comprising the step of generating an incremental relative weighted-intensity metric M1 at measurement event time t for each application process i and for computer system resource j defined as $$M1 = \frac{\sum_{n=1}^{n=N}(X_i(t) * Ticks_i(t))}{\sum_{n=1}^{n=N}Ticks_i(t)},$$

wherein, N is a total number of application processes.

21. The method according to claim 7, further comprising the step of generating a single intensity metric $A_i$ at measurement event time t for each application process i and for computer system resource j defined as $$A_{ij}(t) = \frac{Ticks_{ij}(t)}{Rec_i(t)}.$$

22. The method according to claim 21, further comprising the step of generating a weighted intensity metric M3 at measurement event time t for each application process i and for computer system resource j defined as $$M3 = \frac{\sum_{n=1}^{n=N}(A_i(t)*Ticks_i(t))}{\sum_{n=1}^{n=N}Ticks_i(t)}.$$

23. The method according to claim 22, further comprising the step of generating a relational metric M4 at measurement event time t for each application process i and for computer system resource j defined as $$M4 = \frac{\sum_{n=1}^{n=N}Ticks_i(t)}{\left(\frac{\sum_{n=1}^{n=N}(A_i(t)*Ticks_i(t))}{\sum_{n=1}^{n=N}Ticks_i(t)}\right)}.$$

24. The method according to claim 23, further comprising the step of generating a metric M5 corresponding to a relative measure of production change at measurement event time t for each application process i and for computer system resource j defined as $$M5 = \frac{M4}{M4(0)} * \frac{M3(0)}{M3}.$$

25. The method according to claim 21, further comprising the step of generating an incremental relative intensity metric $X_i$ at measurement event time t with respect to measurement event time t−1 for each application process i and for computer system resource j defined as $$X_i(t) = \frac{A_i(t) - A_i(t-1)}{A_i(t-1)},$$

and wherein, measurement event time t−1 is a measurement event time that immediately precedes measurement event time t.

26. The method according to claim 7, further comprising the step of modelling the application computer system on a computer.

27. The method according to claim 7, further comprising the steps of measuring the first unit of data and measuring the second unit of data are performed on the application computer system.

28. A computer system performance measurement system, comprising:
- a memory storing at least one record associated with a completion of a transaction performed by an i-th application $A_i$ running on a computer system during a predetermined period of time and storing a tick count representing a total amount of a resource of the computer system used by the i-th application $A_i$ for the completion of the transaction during the predetermined period of time, each increment of the tick count representing a unit of consumption of the resource; and
- a processor connected to the memory, the processor generating a first signal for the i-th application process $A_i$, the first signal being related to a performance value and being defined as $$A_i(t) = \frac{Ticks_i(t)}{Rec_i(t)}$$

wherein, $(Rec)_i$ is a number of records generated for completion of the transaction and $(Ticks)_i$ is total tick count for the consumption of the resource.

29. The system according to claim 28, wherein the processor further generates a second signal for the i-th application process $A_i$, the second signal being related to a baseline performance value and being defined as $$A_i(0) = \frac{Ticks_i(0)}{Rec_i(0)}$$

wherein, $A_i(0)$ is measured at a predetermined point in time,
wherein, the processor further generates a third signal for the i-th application process $A_i$ based on the first and second signals, the third signal being defined as $$X_i(t) = \frac{A_i(t)}{A_i(0)},$$

and,
wherein, the processor further generates a fourth performance signal related to a metric value M1, the metric value M1 being defined as $$M1 = \frac{\sum_{n=1}^{n=N}(X_i(t)*Ticks_i(t))}{\sum_{n=1}^{n=N}Ticks_i(t)}$$

wherein, N is a total number of application processes.

30. The system according to claim 28, wherein the transaction performed by the i-th application $A_i$ is a repetitive transaction.

31. The system according to claim 30, wherein the third signal is defined as $$X_i(t) = \frac{A_i(t) - A_i(0)}{A_i(0)}.$$

32. The system according to claim 31, wherein the processor generates a second performance signal related to a metric value M3 based on records and tick counts associated with the transaction that are stored in the memory for the i-th application $A_i$, the second performance signal corresponding to a share of consumption of the resource by the i-th application $A_i$, the metric value M3 being defined as $$M3 = \frac{\sum_{n=1}^{n=N}(A_i(t)*Ticks_i(t))}{\sum_{n=1}^{n=N}Ticks_i(t)}.$$

33. The system according to claim 32, wherein the processor generates a third performance signal related to a metric value M4 based on records and tick counts associated with the transaction that are stored in the memory for the i-th application $A_i$, the third performance signal corresponding to a number of averaged records of the performance of the computer system for the i-th application $A_i$, the metric value M4 being defined as $$M4 = \frac{\left(\sum_{n=1}^{n=N} Ticks_i(t)\right)^2}{\sum_{n=1}^{n=N}\left(\frac{Ticks_i^2(t)}{Rec_i(t)}\right)}.$$

34. The system according to claim 33, wherein the processor generates a fourth performance signal related to a metric value M5 based on records and tick counts associated with the transaction that are stored in the memory for the i-th application $A_i$, the fourth performance signal corresponding to a relative measure of production change of the computer system for the i-th application $A_i$, the metric value M5 being defined as $$M5 = \left(\frac{M4}{M4(0)}\right) * \left(\frac{M3(0)}{M3}\right).$$

35. The system according to claim 34, wherein the tick count represents one of the group consisting of a predetermined unit of time, a predetermined amount of CPU time, and a predetermined number of I/O blocks.

36. The system according to claim 30, wherein the third signal is defined as $$X_i(t) = \frac{A_i(t) - A_i(t-1)}{A_i(t-1)},$$

wherein, t−1 is a measurement time immediately preceding measurement time t.

37. The system according to claim 36, wherein the processor generates a second performance signal related to a metric value M3 based on records and tick counts associated with the transaction that are stored in the memory for the i-th application $A_i$, the second performance signal corresponding to a share of consumption of the resource by the i-th application $A_i$, the metric value M3 being defined as $$M3 = \frac{\sum_{n=1}^{n=N}(A_i(t) * Ticks_i(t))}{\sum_{n=1}^{n=N} Ticks_i(t)}.$$

38. The system according to claim 37, wherein the processor generates a third performance signal related to a metric value M4 based on records and tick counts associated with the transaction that are stored in the memory for the i-th application $A_i$, the third performance signal corresponding to a number of averaged records of the performance of the computer system for the i-th application $A_i$, the metric value M4 being defined as $$M4 = \frac{\left(\sum_{n=1}^{n=N} Ticks_i(t)\right)^2}{\sum_{n=1}^{n=N}\left(\frac{Ticks_i^2(t)}{Rec_i(t)}\right)}.$$

39. The system according to claim 38, wherein the processor generates a fourth performance signal related to a metric value M5 based on records and tick counts associated with the transaction that are stored in the memory for the i-th application $A_i$, the fourth performance signal corresponding to a relative measure of production change of the computer system for the i-th application $A_i$, the metric value M5 being defined as $$M5 = \left(\frac{M4}{M4(0)}\right) * \left(\frac{M3(0)}{M3}\right).$$

40. The system according to claim 39, wherein the tick count represents one of the group consisting of a predetermined unit of time, a predetermined amount of CPU time, and a predetermined number of I/O blocks.

* * * * *